(12) United States Patent
Qi et al.

(10) Patent No.: US 9,561,729 B2
(45) Date of Patent: Feb. 7, 2017

(54) GARAGE AND CHARGING CONNECTOR DEVICE THEREOF

(71) Applicant: BYD COMPANY LIMITED, Shenzhen (CN)

(72) Inventors: Tian Qi, Shenzhen (CN); Jinghua Tang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 151 days.

(21) Appl. No.: 14/403,797

(22) PCT Filed: May 28, 2013

(86) PCT No.: PCT/CN2013/076326
§ 371 (c)(1),
(2) Date: Nov. 25, 2014

(87) PCT Pub. No.: WO2013/178052
PCT Pub. Date: Dec. 5, 2013

(65) Prior Publication Data
US 2015/0139761 A1 May 21, 2015

(30) Foreign Application Priority Data

May 28, 2012 (CN) .......................... 2012 1 0168402

(51) Int. Cl.
| | | |
|---|---|---|
| *H02J 7/00* | (2006.01) | |
| *B60L 11/18* | (2006.01) | |
| *E04H 6/12* | (2006.01) | |
| *E04H 6/42* | (2006.01) | |
| *H01R 13/62* | (2006.01) | |
| *H01R 13/631* | (2006.01) | |

(52) U.S. Cl.
CPC ........ *B60L 11/1818* (2013.01); *B60L 11/1835* (2013.01); *E04H 6/12* (2013.01); *E04H 6/42* (2013.01); *H01R 13/6205* (2013.01); *H01R 13/631* (2013.01); *H01R 13/6315* (2013.01); *B60L 11/1825* (2013.01); *H01R 2201/26* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
CPC .... Y02T 90/14; Y02T 10/7005; Y02T 90/128; Y02T 10/7088; Y02T 90/163

USPC .......................................................... 320/109
See application file for complete search history.

(56) References Cited

U.S. PATENT DOCUMENTS

| | | | |
|---|---|---|---|
| 6,123,569 A | 9/2000 | Fukushima et al. | |
| 2003/0222636 A1 | 12/2003 | Fujishiro et al. | |
| 2008/0185991 A1* | 8/2008 | Harris | B60L 11/1818 320/109 |
| 2013/0021162 A1* | 1/2013 | DeBoer | B60L 11/1824 340/635 |

FOREIGN PATENT DOCUMENTS

| | | |
|---|---|---|
| CN | 201717443 U | 1/2011 |
| CN | 102013597 A | 4/2011 |
| CN | 201838857 U | 5/2011 |
| CN | 102299538 A | 12/2011 |
| CN | 202068227 U | 12/2011 |
| CN | 202076591 U | 12/2011 |
| CN | 202111310 U | 1/2012 |
| CN | 102337789 A | 2/2012 |
| CN | 102354854 A | 2/2012 |
| CN | 202153579 U | 2/2012 |
| CN | 202172160 U | 3/2012 |
| CN | 202217866 U | 5/2012 |
| CN | 202259861 U | 5/2012 |
| CN | 102611160 A | 7/2012 |
| EP | 1302381 A1 | 4/2003 |
| JP | 2000115915 A | 4/2000 |
| JP | 2011078288 A | 4/2011 |
| KR | 101013036 B1 | 2/2011 |
| WO | 2011113940 A2 | 9/2011 |
| WO | 2011150598 A1 | 12/2011 |

OTHER PUBLICATIONS

European Patent Office (EPO) Search Report for EP 13797001.8 May 17, 2016 pp. 1-12.

* cited by examiner

*Primary Examiner* — Arun Williams
(74) *Attorney, Agent, or Firm* — Anova Law Group, PLLC

(57) ABSTRACT

A garage and a charging connector device thereof are provided. The charging connector device comprises a plug, a mounting seat and a charging socket. The plug is mounted to the mounting seat. The mounting seat has a guide shaft. The charging socket has a guide sleeve engageable with or disengageable from the guide shaft, and the plug is capable of inserting into or pulling out of the charging socket.

19 Claims, 5 Drawing Sheets

GARAGE AND CHARGING CONNECTOR DEVICE THEREOF

CROSS-REFERENCES TO RELATED APPLICATIONS

This application is a national phase entry under 35 U.S.C. §371 of International Application No. PCT/CN2013/076326, filed on May 28, 2013, which claims the priority to and benefits of Chinese patent application No. 201210168402.3, filed with the State Intellectual Property Office of P. R. C. on May 28, 2012, the entire contents of all of which are incorporated herein by reference.

FIELD OF THE INVENTION

Embodiments of the present disclosure relate to field of connector device, and particularly to a garage and a charging connector device thereof.

BACKGROUND

This section merely provides background information related to the present disclosure and may or may not constitute prior art.

Generally, a garage system (e.g., a stack garage system) comprises a plurality of garage unites for depositing vehicles. In order to charge the electric vehicle, every garage unit is provided with a separate charge pile. Because the charge piles are disposed in the garage units having different levels respectively, it may take a lot of time for connecting the charge pile to the electric vehicle.

In addition, the charge pile is provided in every garage unit, thus the cost is increased.

BRIEF SUMMARY OF THE DISCLOSURE

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In viewing thereof, the present disclosure is directed to solve at least one of the problems existing in the art. Accordingly, a charging connector device is provided, which may improve the convenience of charging and reduce cost.

Embodiments according to an aspect of the present disclosure provide a charging connector device. The charging connector device may comprise a plug, a mounting seat and a charging socket. The plug is mounted to the mounting seat. The mounting seat has a shaft. The charging socket has a guide sleeve engageable with or disengageable from the guide shaft, and the plug is capable of being inserted into or pulled out of the charging socket.

With the charging connector device according to embodiments of the present disclosure, when the plug is inserted into or pulled out of the charging socket, the guide shaft and the guide sleeve may cooperate to guide the plug to connect with or separate from the charging socket.

Embodiments according to another aspect of the present disclosure provide a garage system. The garage system comprises a plurality of garage units, a carrier, and the charging connector device described above. The carrier may convey a vehicle into or out of the garage units. The plug and the mounting seat of the charging connector device are disposed on the carrier, and the charging socket is disposed at the garage unit.

Additional aspects and advantages of embodiments of present disclosure may be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure may become apparent and more readily appreciated from the following descriptions taken in conjunction with the drawings, in which.

DETAILED DESCRIPTION

Figure 1:
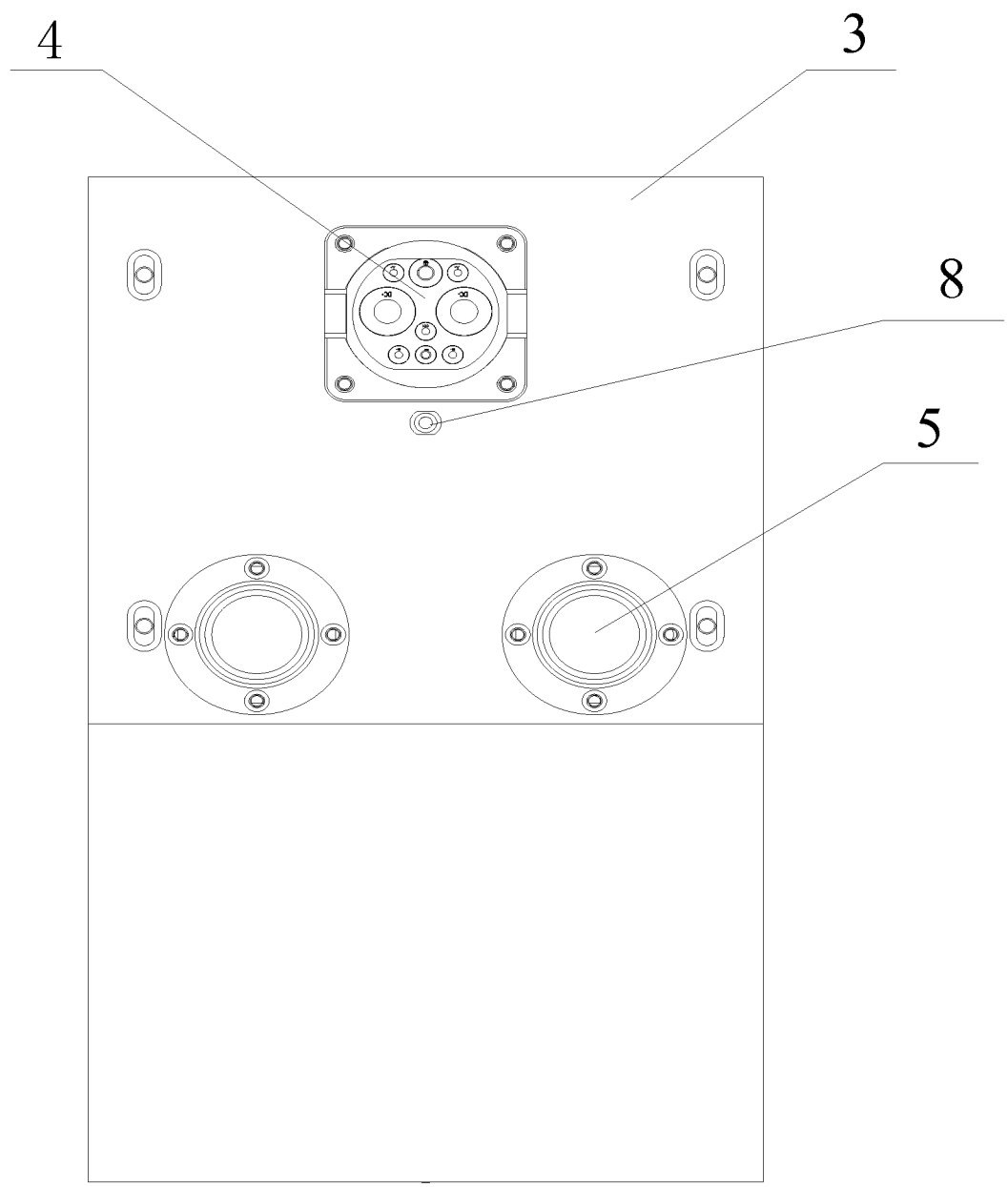
FIG. 1 is a perspective view of a charging socket and a holder of a charging connector device according to an embodiment of the present disclosure, in which the charging socket is disposed on the holder.

Embodiments of the present disclosure will be described in detail in the following descriptions, examples of which are shown in the accompanying drawings, in which the same or similar elements and elements having same or similar functions are denoted by like reference numerals throughout the descriptions. It is to be understood that, the embodiments described herein are merely used to generally understand the present disclosure, but shall not be construed to limit the present disclosure.

In the specification, relative terms such as "central", "longitudinal", "lateral", "front", "rear", "right", "left", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

In addition, terms such as "first" and "second" are used herein for purposes of description and are not intended to indicate or imply relative importance or significance. A charging connector device and a garage system (e.g., a stack garage system) according to embodiment of the present disclosure are described below.

Figure 3:
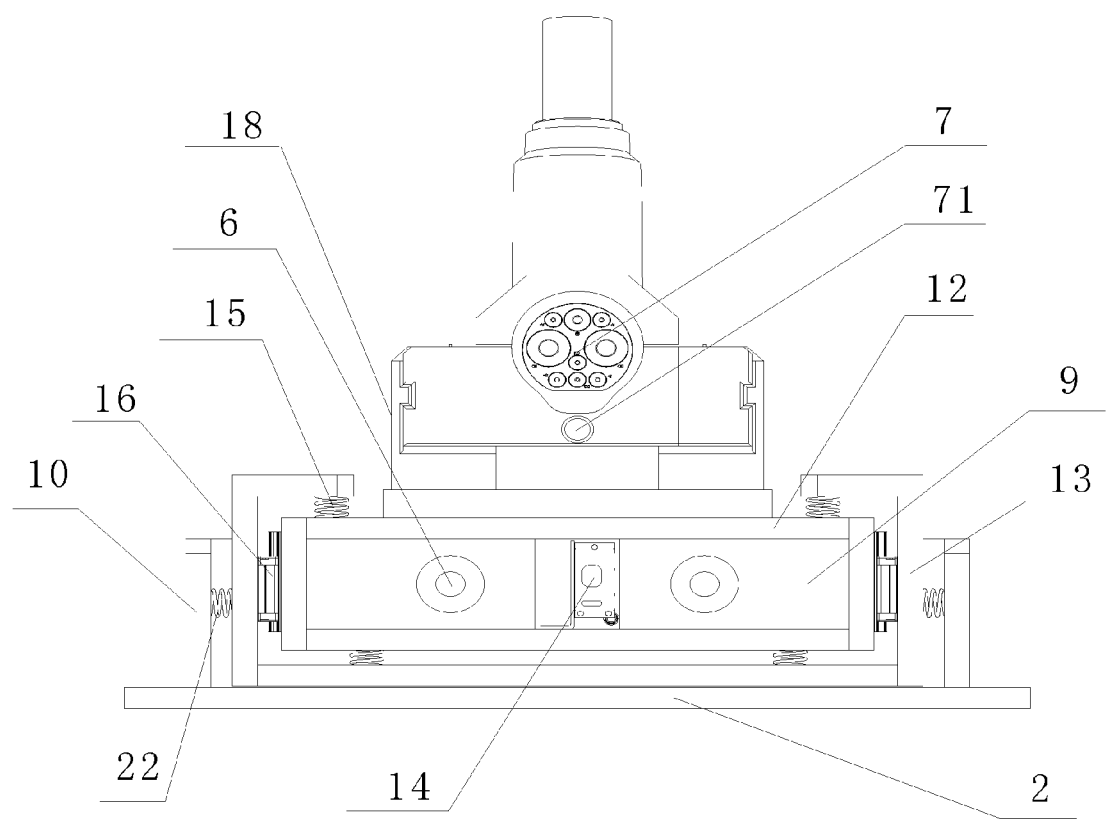
FIG. 3 is a perspective view of the charging connector device according to an embodiment of the present disclosure, in which the plug is mounted on the mounting seat.
Figure 6:
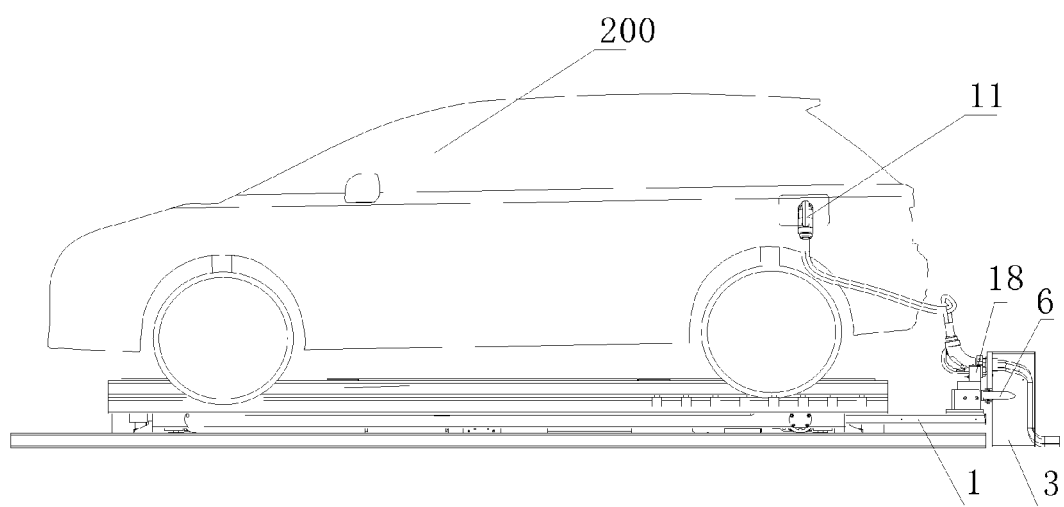
FIG. 6 is a schematic view of the charging connector device according to an embodiment of the present disclosure, in which an electric vehicle is being charged.

As shown in FIG. 1, FIG. 3 and FIG. 6, the charging connector device according to an embodiment of the present disclosure comprises a plug 7, a mounting seat 18 and a charging socket 4. The charging socket 4 is adapted to connect with a power source (not shown). The plug 7 may be capable of being inserted into or pulled out of the charging socket 4. When the plug 7 is inserted into the charging socket 4, the charging gun 11 which is connected with the plug 7 may charge a vehicle 200.

Figure 5:
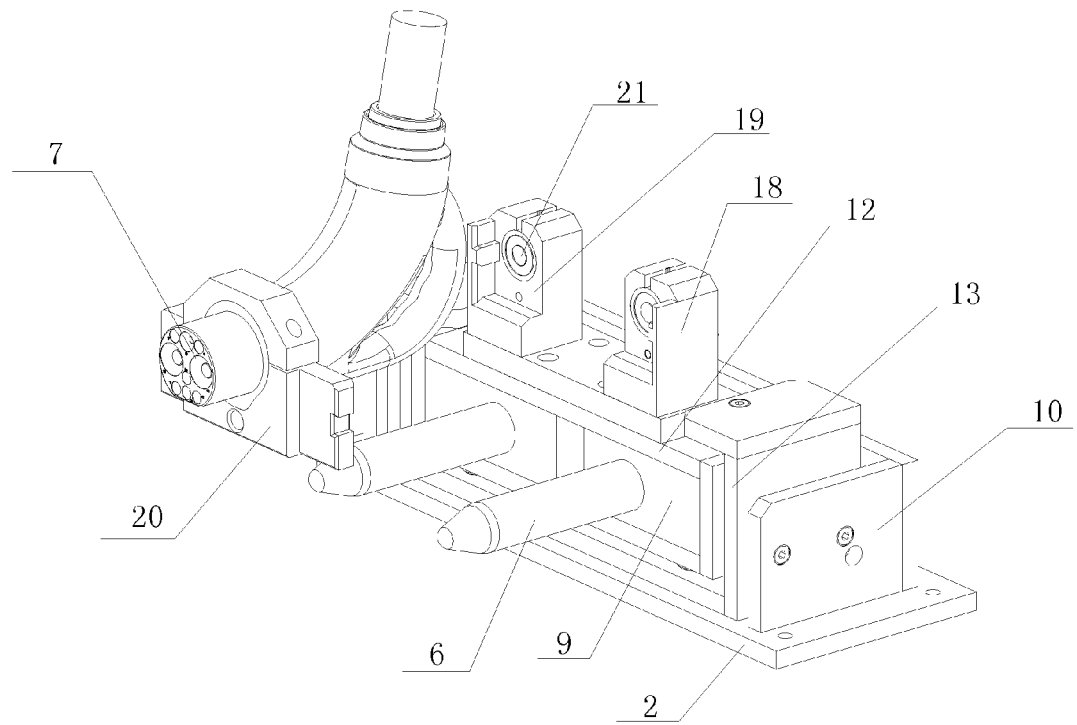
FIG. 5 is a perspective view of the charging connector device according to an embodiment of the present disclosure, in which the plug is apart from the mounting seat.

As shown in FIG. 5, the mounting seat 18 is used for mounting the plug 7, so as to support and secure the plug 7. In an embodiment, the plug 7 may move with the mounting seat 18 before the plug 7 is inserted into the charging socket 4. In other words, the plug 7 can be mounted on the mounting seat 18. The mounting seat 18 may have a guide shaft 6, and the charging socket 4 has a guide sleeve engageable with or disengageable from the guide shaft 6. The plug 7 is capable of being inserted into or pulled out of the charging socket 4. In other words, when the guide shaft 6 is inserted into a guide sleeve 5, the guide shaft 6 is in a relationship of matching with the guide sleeve 5.

With the help of the guide shaft 6 and the guide sleeve 5, the plug 7 is facilitated to be inserted into or pulled out of the charging socket 4, and the guide shaft 6 and the guide sleeve 5 serve the function of guiding and position limiting when the plug 7 is being inserted into or pulled out of the charging socket 4.

In some embodiments, the guide shaft 6 can be made of metal. When the plug 7 is inserted into the charging socket 4, the guide shaft 6 is fitted into the guide sleeve 5. When the plug 7 is pulled out of the charging socket 4, the guide shaft 6 is disengaged from the guide sleeve 5. During the plug 7 being inserted into or pulled out of charging socket 4, the guide shaft 6 and the guide sleeve 5 may guide the movement of the plug 7 and may limit the position of the plug 7. With the guide shaft 6 and the guide sleeve 5, the connection of the plug and the charging socket 4 is more convenient and accurate.

As shown in FIG. 5, in one embodiment, in order that the plug 7 can be separated from the mounting seat 18 after the plug 7 is connected with the charging socket 4, the mounting seat 18 has a fixture groove 19, and the plug 7 has a fixture 20 matching with the fixture groove 19. During insertion of the plug 7 into the charging socket 4, the fixture 20 is fitted into the fixture groove 19, and after the plug 7 is connected with the charging socket 4, the fixture 20 is capable of being separated from the fixture groove 19.

In an embodiment, an electromagnet 21 is disposed in the fixture groove 19 for attracting the fixture 20. For example, the electromagnet 21 is disposed on or in the inner wall of the fixture groove 19. The electromagnet 21 keeps the fixture 20 into the fixture groove 19 by attracting the fixture 20 when the electromagnet 21 is energized, so that the fixture 20 is fitted in the fixture groove 19. Also, the electromagnet 21 permits the fixture 20 to disengage from the fixture groove 19 when the electromagnet 21 is deenergized. The fixture 20 is separated from the fixture groove 19, so that the plug 7 which is connected with the fixture 20 can be separated from the mounting seat 18. During charging, the electromagnet 21 is deenergized, and the plug 7 is separated from the mounting seat 18. After the charging is completed, the electromagnet 21 is energized. The fixture 20 is attracted by the electromagnet 21. The plug 7 is moved with the fixture 20 and mounted onto the mounting seat 18, thereby the plug 7 and the mounting seat 18 together can be separated from the charging socket 4.

Figure 4:
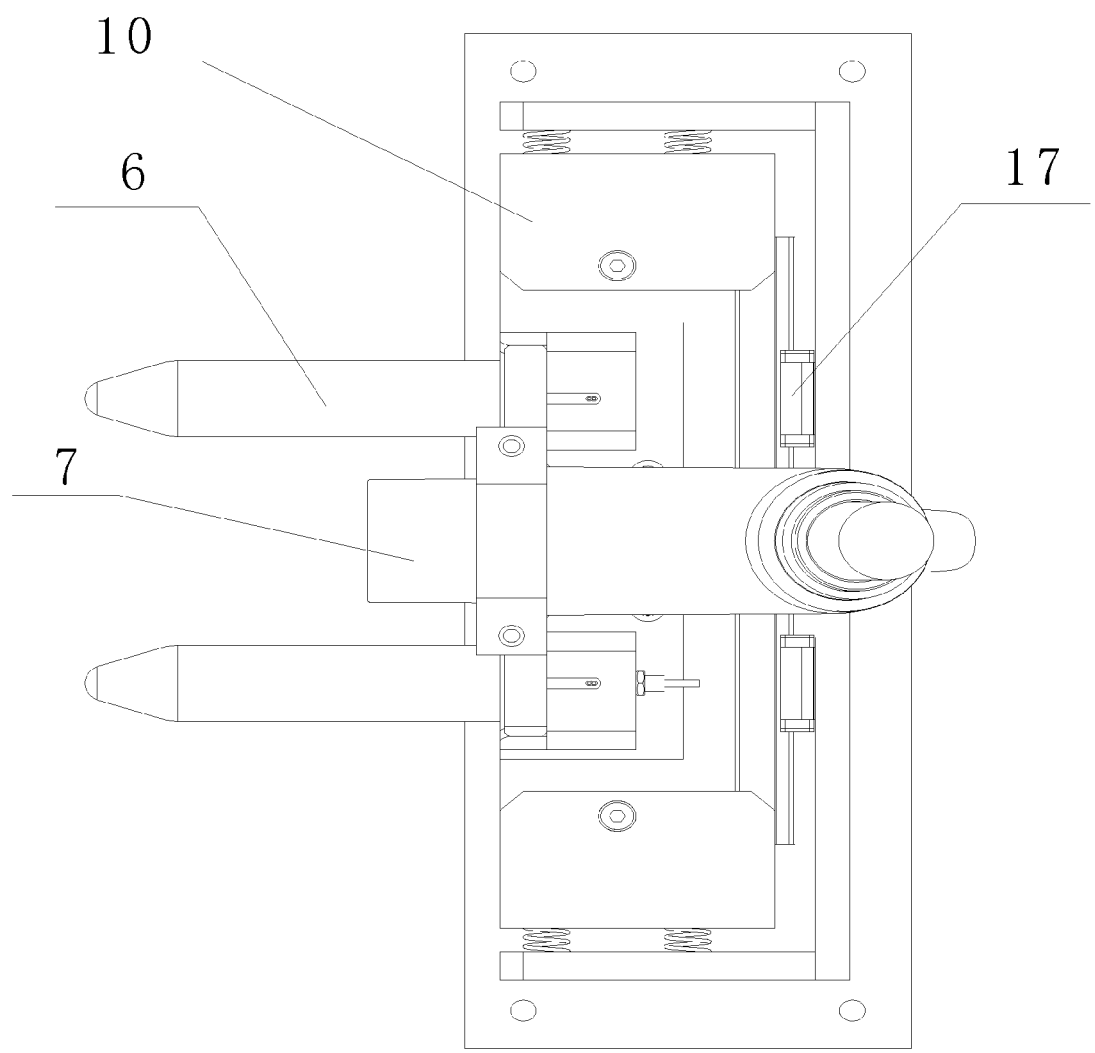
FIG. 4 is a perspective top view of FIG. 3.

As shown in FIG. 3 and FIG. 4, in order to improve the accuracy and efficiency of the connection between the plug 7 and the charging socket 4, the mounting seat 18 has an adjusting device 9 to facilitate the insertion of the plug 7 into the charging socket 4 and pulling the plug 7 out of the charging socket 4. The adjusting device 9 permits the plug 7 to move upwardly and downwardly and/or leftwardly and rightwardly within a predetermined range, thus facilitating the connection between the plug 7 and the charging socket 4.

In one embodiment, the adjusting device 9 comprises a first moveable frame 12, a second moveable frame 13, a first linear guide rail 16 and a second linear guide rail 17. The first linear guide rail 16 is perpendicular to the second linear guide rail 17. For example, the first linear guide rail 16 is disposed along an up-down direction, and the second linear guide rail 17 is disposed along a left-right direction.

The first moveable frame 12 is mounted on the first linear guide rail 16 and moveable in the up-down direction. The second moveable frame 13 is mounted on the second linear guide rail 17 and moveable in the left-right direction. The first moveable frame 12 is disposed within the second moveable frame 13.

The guide shaft 6 is disposed on the first moveable frame 12. A first elastic member 15 for restoration is disposed between the first moveable frame 12 and the second moveable frame 13. Depending on the elastic force of the first elastic member 15, the adjusting device 9 can restore to the initial state after being adjusted. During insertion of the plug 7 into the charging socket 4 or pulling of the plug 7 out of the charging socket 4, the guide shaft 6 can swing in the direction of up-down and the direction of left-right, so that the guide shaft 6 can be easily inserted into the guide sleeve 5. The fitting of the guide shaft 6 in the guide sleeve 5 may guide the connection between the plug 7 and the charging socket 4. The first elastic member 15 may be configured as a spring.

In one embodiment, the charging connector device further comprises a base 2 and a support frame 10. The support frame 10 is mounted on the base 2 for supporting the adjusting device 9. A second elastic member 22 is disposed between the second moveable frame 13 and the support frame 10. The second elastic member 22 may be configured as a spring.

As shown in FIG. 3, the first linear guide rail 16 is disposed on outer side wall of the second moveable frame 13 respectively, and a plurality of the first elastic members 15 are disposed between the second moveable frame 13 and top and bottom surfaces of the first moveable frame 12 respectively. The second linear guide rail 17 is disposed on the support frame 10, and a plurality of the second elastic members 22 are disposed between the support frame 10 and right and left sides of the second moveable frame 13 respectively.

In some embodiments, the number of the guide shaft 6 is two, and the two guide shafts 6 are disposed on the first movable frame 12 and spaced apart from each other.

Through the base 2, the plug 7 and the adjusting device 9 can be disposed on the other device (not shown), facilitating the displacement of the charging connector device.

Figure 2:
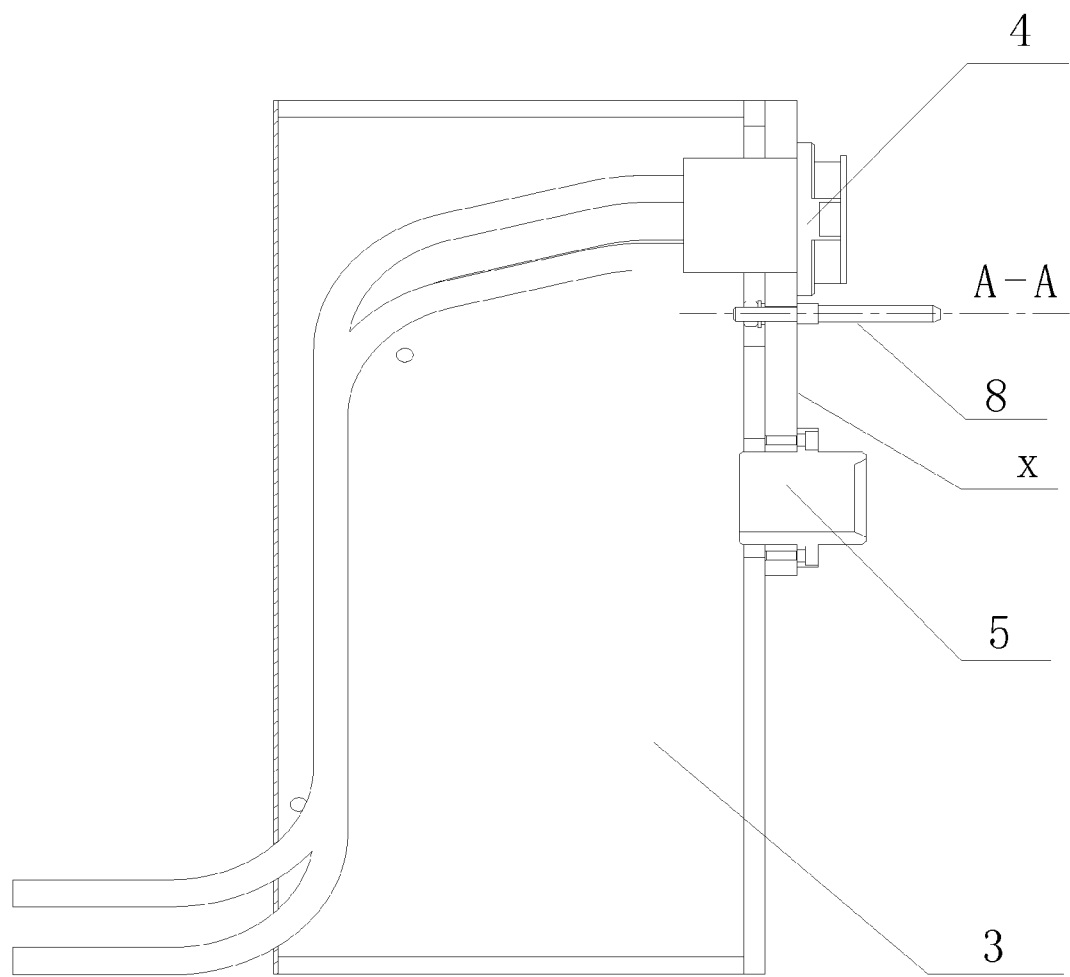
FIG. 2 is a perspective side view of FIG. 1.

As shown in FIG. 2, in some embodiments, the charging connector device further comprises a holder 3 for mounting the charging socket 4 thereon. The holder 3 has a surface X facing to the mounting seat 18, and an axis A-A of the guide sleeve 5 is perpendicular to the surface X. The charging socket 4 is mounted on the holder 3 instead of charging pile, and the displacement ability of the charging socket 4 is improved.

As shown in FIG. 2, when the plug 7 is connected with (i.e., inserted into) the charging socket 4, the mounting seat 18 is separated from the plug 7. Because the plug 7 has certain deadweight, if the plug 7 is supported only by the connection force between the plug 7 and the charging socket 4, the plug or the charging socket 4 tends to be damaged. In an embodiment, the plug 7 has a through hole 71, and the holder 3 has a support column 8 for supporting the plug 7 and capable of being inserted into or pulled out of the through hole 71. An axis A-A of the support column 8 is perpendicular to the surface X. When the connection of the plug 7 with the charging socket 4 is completed, the support column 8 is inserted into the through hole 71 to support the plug 7.

As shown in FIG. 3, in some embodiments, in order to ensure the reliability of the connection of the plug 7 and the charging socket 4, the charging connector device further comprises a laser ranging sensor 14 mounted on the first movable frame 12 between the two guide shafts 6. The laser ranging sensor 14 is used for detecting the distance between the plug 7 and the charging socket 4. A predetermined distance between the plug 7 and the charging socket 4, after the plug 7 is completely inserted into the charging socket 4, is preset in the laser ranging sensor 14. When the cooperation of the plug 7 and the charging socket 4 is completed, the laser ranging sensor 14 can deenergize the electromagnet 21, and the electromagnet 21 does not attract the plug 7 anymore, thereby the plug 7 can be separated from the mounting seat 18.

A garage system is described below.

As shown in FIG. 6, the garage system according to an embodiment of the present disclosure comprises a plurality of garage units (not shown), a carrier 1 and the charging connector device described as above with reference to the embodiments. The carrier 1 is used for conveying a vehicle into or out of the garage units. The plug 7 and the mounting seat 18 of the charging connector device are disposed on the carrier 1, and the charging socket 4 is disposed on the holder 3, which is disposed at the garage unit. One end of the plug 7 is connected with a charging gun 11 via a wire. The charging gun 11 can be connected to the vehicle for charging the vehicle. The plug 7 and the mounting seat 18 are mounted on the carrier 1 via the base 2.

When the carrier 1 moves a vehicle into a garage unit, the guide shaft 6 may be easily fitted into the guide sleeve 5 via the adjusting device 9. With the guiding of the guide sleeve 5, the plug 7 is connected with the charging socket 4 and starts to charge the vehicle. When the electromagnet 21 is deenergized, the electromagnet 21 does not attract the plug 7, thereby the plug 7 can be separated from the mounting seat 18, and the mounting seat 18 can move along with the carrier 1 out of the garage unit and convey another vehicle to another garage unit. With the cooperation of the guide shaft 6 and the guide sleeve 5, the connection between the plug 7 and the charging socket 4 is convenient. In addition, the plug 7 can be separated from the mounting seat 18, so that the mounting base 18 can be used repeatedly, which increases the utilization rate of the mounting seat 18, and reduces the number of the charging devices, thus reducing the cost.

The charging connector device according to embodiments of the present disclosure comprises the plug, the mounting seat for mounting the plug thereon and the charging socket for connecting with the plug. The mounting seat has the guide shaft or column for cooperating with the guide sleeve so as to facilitate the connection of the plug and the charging socket. With the cooperation of the guide shaft and the guide sleeve, the connection of the plug and the charging socket is accurate and easy. Depending on the adjusting device, the permissible moving range of the guide shaft is large enough for the insertion of the guide shaft into the guide sleeve.

With the garage according to embodiments of the present disclosures, the mounting seat is disposed on the carrier, and the charging sockets are disposed at the garage units respectively. When the carrier carrying the vehicle moves into a garage unit, the plug is connected with the charging socket so as to charge the vehicle. In addition, the electromagnet is deenergized. The plug is separated from the mounting base, and the plug inserted into the charging socket is supported by the support column. Then the carrier and the mounting base are moved out of the garage unit for conveying other vehicle to another garage unit. After the charging of the vehicle is finished, the carrier enters into the garage unit. The guide shaft is inserted into the guide sleeve, and the mounting base is against the plug. Then the electromagnet is energized to attract the plug, so that the plug is secured to the mounting base. The carrier carrying the vehicle moves out of the garage unit, and the plug is separated from the charging socket, thus finishing the charging of the vehicle in the garage. Therefore, the plug and the charging socket can be connected and disconnected by moving the carrier, and the operation is simple.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A charging connector device, comprising:
   a plug;
   a mounting seat for mounting the plug thereto, the mounting seat having a guide shaft; and
   a charging socket having a guide sleeve engageable with or disengageable from the guide shaft, the plug being inserted into or pulled out of the charging socket;
   wherein the mounting seat has an adjusting device to facilitate an insertion of the plug into the charging socket;
   wherein the adjusting device comprises:
      a first moveable frame on which the guide shaft is disposed,
      a second moveable frame in which the first moveable frame is disposed,
      a first elastic member disposed between the first moveable frame and the second moveable frame,
      a first linear guide rail on which the first moveable frame is disposed and along which the first moveable frame is moveable in an up-down direction, and a second linear guide rail on which the second moveable frame is disposed and along which the second movable frame is moveable in a left-right direction.

2. The charging connector device as set forth in claim 1, wherein the mounting seat has a fixture groove, and the plug has a fixture for fitting in the fixture groove.

3. The charging connector device as set forth in claim 2, wherein an electromagnet is disposed in the fixture groove, the electromagnet keeps the fixture into the fixture groove by attracting the fixture when the electromagnet is energized, and the electromagnet permits the fixture to disengage from the fixture groove when the electromagnet is deenergized.

4. The charging connector device as set forth in claim 1, further including:
   a support frame mounted on the support frame; and
   a second elastic member disposed between the second moveable frame and the support frame.

5. The charging connector device as set forth in claim 4, wherein:
   the first linear guide rail is disposed on outer side walls of the second moveable frame, and a plurality of the first elastic members are disposed between the second moveable frame and top and bottom surfaces of the first moveable frame respectively, and
   the second linear guide rail is disposed on the support frame, and a plurality of the second elastic members are disposed between the support frame and right and left sides of the second moveable frame respectively.

6. The charging connector device as set forth in claim 5, further including:
   a holder on which the charging socket is mounted, wherein the holder has a surface facing to the mounting seat, and an axis of the guide sleeve is perpendicular to the surface.

7. The charging connector device as set forth in claim 6, wherein:
   the plug has a through hole, the holder has a support column for supporting the plug and capable of being inserted into or being pulled out of the through hole, and an axis of the support column is perpendicular to the surface.

8. The charging connector device as set forth in claim 7, wherein a total number of the guide shaft is two, and the two guide shafts are disposed on the first movable frame and spaced apart from each other.

9. The charging connector device as set forth in claim 1, further including:
   a laser ranging sensor mounted on the first movable frame between the two guide shafts.

10. A garage system, comprising:
    a plurality of garage units;
    a carrier for conveying a vehicle into or out of the garage units; and
    a charging connector device including:
       a plug;
       a mounting seat for mounting the plug thereto, the mounting seat having a guide shaft; and
       a charging socket having a guide sleeve engageable with or disengageable from the guide shaft, the plug being capable of being inserted into or pulled out of the charging socket,
    wherein the plug and the mounting seat of the charging connector device are disposed on the carrier and the charging socket is disposed at the garage unit.

11. The garage system as set forth in claim 10, wherein the mounting seat has a fixture groove, and the plug has a fixture for fitting in the fixture groove.

12. The garage system as set forth in claim 11, wherein an electromagnet is disposed in the fixture groove, the electromagnet keeps the fixture into the fixture groove by attracting the fixture when the electromagnet is energized, and the electromagnet permits the fixture to disengage from the fixture groove when the electromagnet is deenergized.

13. The garage system as set forth in claim 12, wherein the mounting seat has an adjusting device to facilitate an insertion of the plug into the charging socket.

14. The garage system as set forth in claim 13, wherein the adjusting device comprises:
    a first moveable frame on which the guide shaft is disposed;
    a second moveable frame in which the first moveable frame is disposed;
    a first elastic member disposed between the first moveable frame and the second moveable frame,
    a first linear guide rail on which the first moveable frame is disposed and along which the first moveable frame is moveable in an up-down direction; and
    a second linear guide rail on which the second moveable frame is disposed and along which the second movable frame is moveable in a left-right direction.

15. The garage system as set forth in claim 14, further including:
    a base;
    a support frame mounted on the support frame; and
    a second elastic member disposed between the second moveable frame and the support frame.

16. The garage system as set forth in claim 15, wherein the first linear guide rail is disposed on outer side walls of the second moveable frame, and a plurality of the first elastic members are disposed between the second moveable frame and top and bottom surfaces of the first moveable frame respectively,
    wherein the second linear guide rail is disposed on the support frame, and a plurality of the second elastic members are disposed between the support frame and right and left sides of the second moveable frame respectively.

17. The garage system as set forth in claim 16, further including:
    a holder on which the charging socket is mounted, wherein the holder has a surface facing to the mounting seat, and an axis of the guide sleeve is perpendicular to the surface.

18. The garage system as set forth in claim 17, wherein:
    the plug has a through hole;
    the holder has a support column for supporting the plug and capable of one of being inserted into and being pulled out of the through hole; and
    an axis of the support column is perpendicular to the surface.

19. A charging connector device, comprising:
    a plug;
    a mounting seat for mounting the plug thereto, the mounting seat having a guide shaft; and
    a charging socket having a guide sleeve engageable with or disengageable from the guide shaft, the plug being inserted into or pulled out of the charging socket;
    wherein the mounting seat has an adjusting device to facilitate an insertion of the plug into the charging socket;
    wherein the adjusting device comprises:
       a first moveable frame on which the guide shaft is disposed, a second moveable frame in which the first moveable frame is disposed, a first elastic member disposed between the first moveable frame and the second moveable frame, a first linear guide rail on which the first moveable frame is disposed and along which the first moveable frame is moveable in an up-down direction, and a second linear guide rail on which the second moveable frame is disposed and along which the second movable frame is moveable in a left-right direction;

wherein the mounting seat has a fixture groove, and the plug has a fixture for fitting in the fixture groove; and wherein an electromagnet is disposed in the fixture groove, the electromagnet keeps the fixture into the fixture groove by attracting the fixture when the electromagnet is energized, and the electromagnet permits the fixture to disengage from the fixture groove when the electromagnet is deenergized.

\* \* \* \* \*